United States Patent
Colten (10) Patent No.: US 7,207,292 B1
(45) Date of Patent: Apr. 24, 2007

(54) APPARATUS AND METHOD FOR INCREASING CAPACITY OF AUTOMATED LITTER BOX

(76) Inventor: Steven K. Colten, 1337 Gary Way, Carmichael, CA (US) 95608

( * ) Notice: Subject to any disclaimer, the term of this patent is extended or adjusted under 35 U.S.C. 154(b) by 0 days.

(21) Appl. No.: 10/755,021

(22) Filed: Jan. 8, 2004

Related U.S. Application Data (60) Provisional application No. 60/439,553, filed on Jan. 14, 2003.

(51) Int. Cl.
B63H 25/10 (2006.01)

(52) U.S. Cl. .................. 119/161; 119/166; 119/165; D30/161; D30/162

(58) Field of Classification Search ............. 119/161, 119/163–170; D30/161, 162
See application file for complete search history.

(56) References Cited

U.S. PATENT DOCUMENTS

| | | | | |
|---|---|---|---|---|
| 3,482,546 A | * | 12/1969 | Anderson | 119/166 |
| 3,735,735 A | * | 5/1973 | Noroian | 119/165 |
| 3,828,733 A | * | 8/1974 | Correia | 119/14.03 |
| 4,886,014 A | * | 12/1989 | Sheriff | 119/166 |
| 5,048,465 A | | 9/1991 | Carlisi | |
| 5,226,388 A | * | 7/1993 | McDaniel | 119/166 |
| 5,279,258 A | * | 1/1994 | Kakuta | 119/164 |
| 5,329,878 A | * | 7/1994 | McCauley | 119/165 |
| 5,329,879 A | * | 7/1994 | Walton | 119/166 |
| 5,394,835 A | * | 3/1995 | Gatta | 119/170 |
| 5,544,620 A | * | 8/1996 | Sarkissian | 119/166 |
| 5,803,016 A | * | 9/1998 | Poulson | 119/161 |
| 6,082,302 A | | 7/2000 | Thaler et al. | |
| RE36,847 E | | 9/2000 | Waters | |
| 6,126,015 A | * | 10/2000 | Haymaker | 209/235 |
| 6,205,954 B1 | * | 3/2001 | Bogaerts | 119/166 |
| 6,418,880 B1 | * | 7/2002 | Chiu | 119/162 |
| 6,701,868 B1 | * | 3/2004 | Shepherd | 119/166 |
| 2002/0069830 A1 | * | 6/2002 | Clemmons | 119/165 |
| 2003/0217700 A1 | * | 11/2003 | Northrop et al. | 119/166 |
| 2004/0079291 A1 | * | 4/2004 | Romatowski | 119/161 |

FOREIGN PATENT DOCUMENTS

| | | | |
|---|---|---|---|
| EP | 0972442 A1 | * | 1/2000 |
| FR | 2693349 A1 | * | 1/1994 |

* cited by examiner

Primary Examiner—Peter M. Poon
Assistant Examiner—Andrea M. Valenti
(74) Attorney, Agent, or Firm—Bernhard Kreten Weintraub Genshlea Chediak (57) ABSTRACT

An improved automated litter box system which provides increased storage capacity of a waste receptacle which receives animal waste and clumped litter. The increased capacity of the waste receptacle is achieved by elevating the automated litter box system with an elevating apparatus so that a replacement waste receptacle of larger volume can replace the waste receptacle of the litter box system. The invention provides improved automated litter box systems which incorporate such a large volume waste receptacle as a component thereof. The elevating apparatus includes an elevated platform on which the lifter box system is placed. A ramp is provided to provide animal access to the system placed on the elevated platform.

23 Claims, 4 Drawing Sheets

APPARATUS AND METHOD FOR INCREASING CAPACITY OF AUTOMATED LITTER BOX

CROSS-REFERENCE TO RELATED APPLICATIONS

This application claims the priority benefit under 35 U.S.C. § 119(e) of U.S. provisional application No. 60/439,553 filed on Jan. 14, 2003.

BACKGROUND OF THE INVENTION

1. Field of the Invention

The present invention relates to automated litter box systems of the type which automatically scoop animal waste and clumped waste litter into an odor-containing waste receptacle and to devices for use in conjunction with such systems.

2. Description of the Related Art

The invention of automated litter box systems that automatically scoop clumped waste litter into an odor-containing receptacle has greatly improved the quality of life for pets and their owners. These litter box systems, and the pets that use them, are cleaner and more sanitary with less effort required from the owners.

However, even automated litter box systems require periodic intervention and maintenance from pet owners. This is particularly true for the rake-type automated litter box system, where a sensor triggers a rake to sweep across the litter to remove waste after the pet has used the litter box. Owners must empty the waste receptacle before it reaches capacity or unsanitary conditions will develop. Also, for rake-type automated litter box systems, the owner must also clear waste stuck to the rake, scoop waste from the litter that is not able to be collected by the rake, and evenly redistribute litter in the box if the litter should collect in some areas and be absent in others, among other general maintenance tasks.

The present design of automated litter box systems, particularly the rake-type, allows for only a modest capacity for waste collection. The waste collection capacity can be approximated by the volume of a trapezoidal polyhedron whose sides are defined by the width of the automated litter box, the length of an aperture to allow waste to pass through, the length of a surface on which the collected waste will fall, and the height between the aperture and the waste collection surface. The dynamics of waste falling and piling up on to a surface create a maximum effective length of the waste collection surface. This maximum length is proportional to the height between the plane of the aperture and the plane of the waste collection surface. Currently available (i.e., prior art) automated litter box systems have the waste collection surface at or above the same plane as the bottom surface of the litter box. This fixes the maximum height between the plane of the waste collection surface and the plane of the aperture, limiting the total waste collection capacity. The waste collection capacity and the pet usage patterns of the litter box establish the frequency required of the owner to empty the waste receptacle to maintain sanitary conditions. The waste collection capacity limit of the currently available automated litter box systems unnecessarily increases the frequency of maintenance required of the owner. Automated litter box manufacturers sell containers designed to fit in this limited waste collection volume to contain a limited amount of pet waste.

Therefore, there exists a need for a method and apparatus for decreasing the amount of owner maintenance of automated litter box systems. This can be accomplished by increasing the waste collection volume of currently available automated litter box systems such as the automated litter box system described in U.S. Pat. No. 6,082,302, the specification of which is incorporated herein by reference.

SUMMARY OF THE INVENTION

The waste collection volume of currently available automated litter box systems may be increased by extending the waste receptacle of the litter box system so that it extends to a location which is located lower than the bottom surface of the litter box or lower than the remaining portion of the litter box system (i.e., lower than the bottom or lowest point of the automated litter box system). Preferably the waste receptacle is extended so that the lowest point thereof is lower than any other portion of the automated litter box system. This is advantageously accomplished by providing an elevated platform on which the system can be placed so that a bottom portion of the waste receptacle can extend below the platform to thereby provide an elongated and larger waste receptacle. The elongated larger waste receptacle of the present invention is advantageously configured to replace the smaller waste receptacle of the currently available automated litter box systems so that the invention can be used to retrofit currently available automated litter box systems.

Preferably the present invention essentially comprises a raised platform on which the automated litter box rests, and a ramp to allow pets easy access to the litter box. Raising the automated litter box above the surface for which it was designed to rest creates additional waste storage capacity for the automated litter box system by increasing the volume of the trapezoidal polyhedron described above. The lower plane of waste collection surface is maintained, but the raised platform increases the height between it and the plane of the waste aperture, enabling a longer waste collection surface and an increased waste storage capacity of the system. A larger waste storage container can now be placed in this larger waste collection volume to collect pet waste. The elevation of said litter box also creates a volume of space underneath it which can be used for non-waste storage such as cat litter accessories like litter scoops or brushes.

The present invention deceases the amount of owner maintenance by decreasing the frequency that the waste storage container needs to be emptied. The present invention also decreases the amount of time required for performing maintenance tasks by enabling related accessories to be stored conveniently in the space underneath the elevated litter box and easily accessible.

There has thus been outlined, in a broad manner, the most important features of the invention such that the detailed description thereof that follows may be better understood and that the present contribution to the art may be better appreciated.

It is accordingly an object of the present invention to provide a new and improved method and apparatus for increasing storage capacity of animal waste (e.g., fecal matter and clumped urine soaked litter) which collect in the waste collection receptacle of automated litter box systems.

DESCRIPTION OF PREFERRED EMBODIMENTS

In accordance with a preferred embodiment of the present invention, the apparatus comprises:

A base, having a top surface and a bottom surface.

A platform, having a top surface and a bottom surface. The platform is elevated by a plurality of legs extending from the top surface of the base to the bottom surface of the platform.

A ramp, extending from the end of the base to the plane of the platform. The ramp is supported by a left sidewall or panel and a right sidewall or panel.

In accordance with a preferred embodiment of the present invention, the method comprises:

a) providing an apparatus with a base, a platform, and a ramp as described; and
b) placing the litter box on the platform of the apparatus; and
c) collecting waste material in a storage container below the plane of the bottom surface of the litter box.

Figure 7:
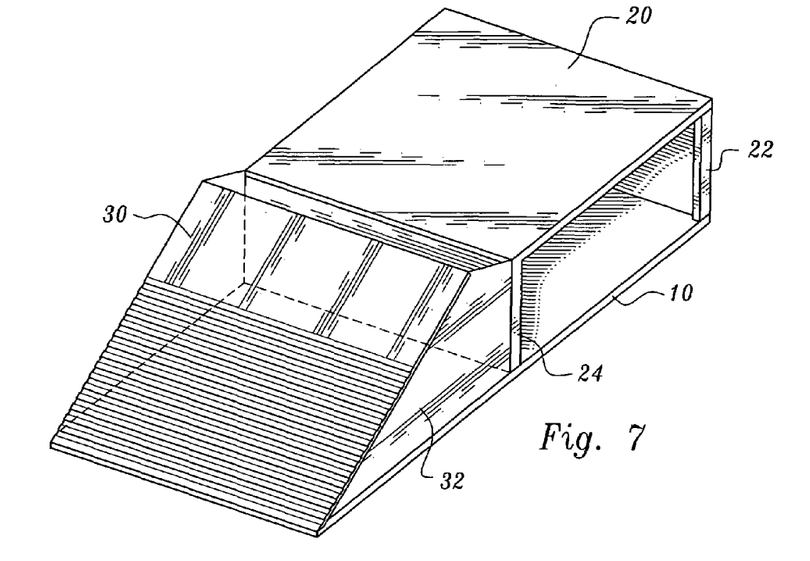
FIG. 7 is a perspective view of an embodiment of the invention.
Figure 8:
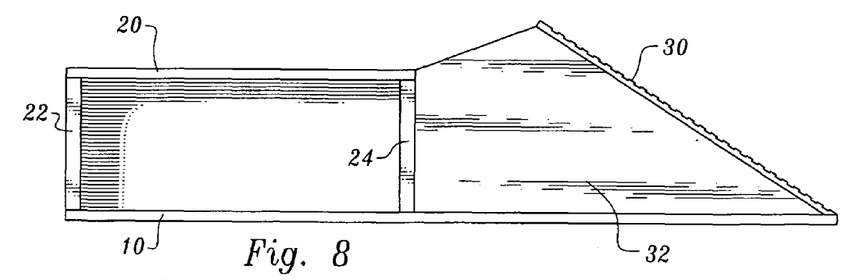
FIG. 8 is a side view of the invention depicted in FIG. 7.
Figure 9:
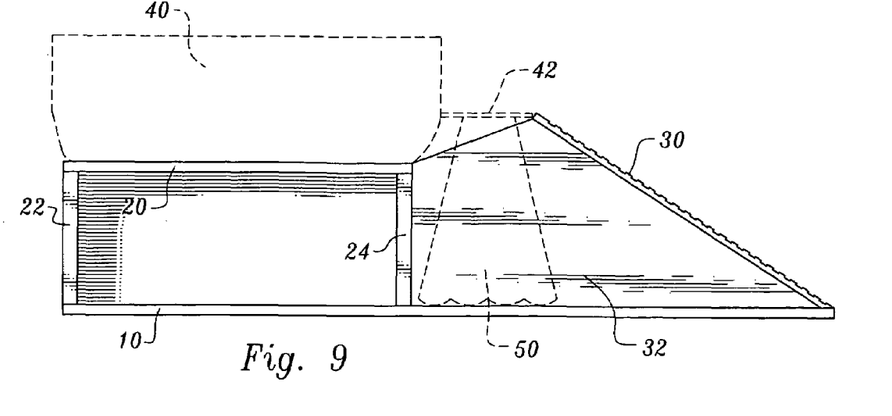
FIG. 9 is a side view of the invention which includes an automated litter box placed on the platform and a waste storage container placed in position to collect scooped waste.

Referring to FIGS. 7–9, the present invention comprises a base 10, a platform 20, and a ramp 30.

Base 10 is a rectangular piece, substantially planar. The precise width, length, and thickness are not critical.

Platform 20 is a rectangular piece, substantially planar. The precise width, length, and thickness are not critical, however the width and length of platform 20 is approximately the same width and length of the litter box that it will be supporting. Platform 20 is supported by legs 22 and partition 24. The precise dimensions of legs 22 and partition 24 are not critical, as long as the height of legs 22 and height and width of partition 24 are sufficient to create additional volume under platform 20 and sufficient enclosed volume under ramp 30, and the thickness of legs 22 and partition 24 are sufficient to support the weight of the fully loaded litter box on platform 20.

Ramp 30 is a rectangular piece, substantially planar, extending towards platform 20 from the end of base 10. The precise width, length, and thickness of ramp 30 are not critical; however the width is approximately the same width as platform 20, and the length sufficient to reach the height of the litter box supported on platform 20. Ramp 30 is supported by approximately triangular sidewalls 32. The precise dimensions of sidewalls 32 are not critical; however, the thickness should be sufficient to support the fully loaded ramp 30, and the length should extend from under ramp 30 to partition 24. Ramp 30 extends toward but does not connect to platform 20. Ramp 30, sidewalls 32, base 10 and partition 24 create an enclosed volume with an aperture adjacent to platform 20.

A conventional automated litter box 40 with waste storage container cover 42 is placed on platform 20 and positioned such that an aperture adjacent to platform 20 is covered. A conventional waste storage container 50 is placed in the volume enclosed by base 10, partition 24, ramp 30, and sidewalls 32 and positioned such that waste scooped by the automated litter box will fall into said container when cover 42 is opened.

In operation one places the invention under a conventional automated litter box, removing the standard-sized waste storage container and positioning the litter box such that waste automatically scooped will fall through the aperture. A larger waste storage container is positioned to collect waste falling through the aperture, the larger sized container taking advantage of the expanded volume created for waste storage due to the elevation of the litter box onto the platform.

The apparatus of the invention which includes an elevated platform may be used so that a conventional automated litter box system may be retrofitted with a larger waste receptacle. Such retrofitting requires positioning of the automated litter box system in an elevated position and replacing the existing waste receptacle with a replacement waste receptacle which is larger than the original waste receptacle. Alternatively, the invention also contemplates an improved automated litter box system which incorporates all of the elements required to provide a large waste receptacle so that retrofitting of an existing automated waste receptacle is not required.

Figure 1:
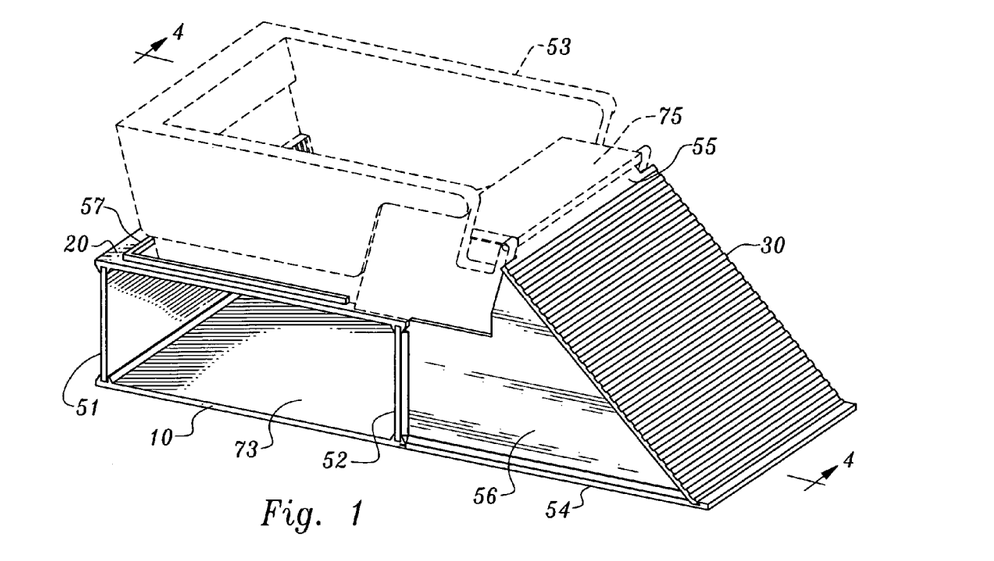
FIG. 1 is a perspective view of an apparatus of the present invention which is used in conjunction with a conventional automated litter box system to increase the waste collection volume thereof.

FIG. 1 depicts an embodiment of the invention which provides an elevated platform 20 supported over and spaced apart from base 10. The elevated platform 20 is held in an elevated position over base 10 by two platform support panels 51 and 52 which extend from the platform 20 to the base 10. Platform 20 is advantageously configured to hold a conventional automated litter box system 53 thereon.

An animal access ramp 30 extends upward from extension 54 of base 10 so that an upper end 55 of ramp 30 lies adjacent to a lid 75 of the conventional litter box system 53. The ramp 30 is advantageously supported by a pair of ramp support panels 56. Support panels 56 preferably extend from extension 54 to the ramp 30.

An upwardly extending frame 57 may be provided on a top surface of platform 20 to help keep the automated litter box system 53 in place.

Platform support 52 also serves as a partition to separate a volume of space which lies between the elevated platform 20 and base 10 from the space which lies between ramp 30 and extension 54.

Figure 3:
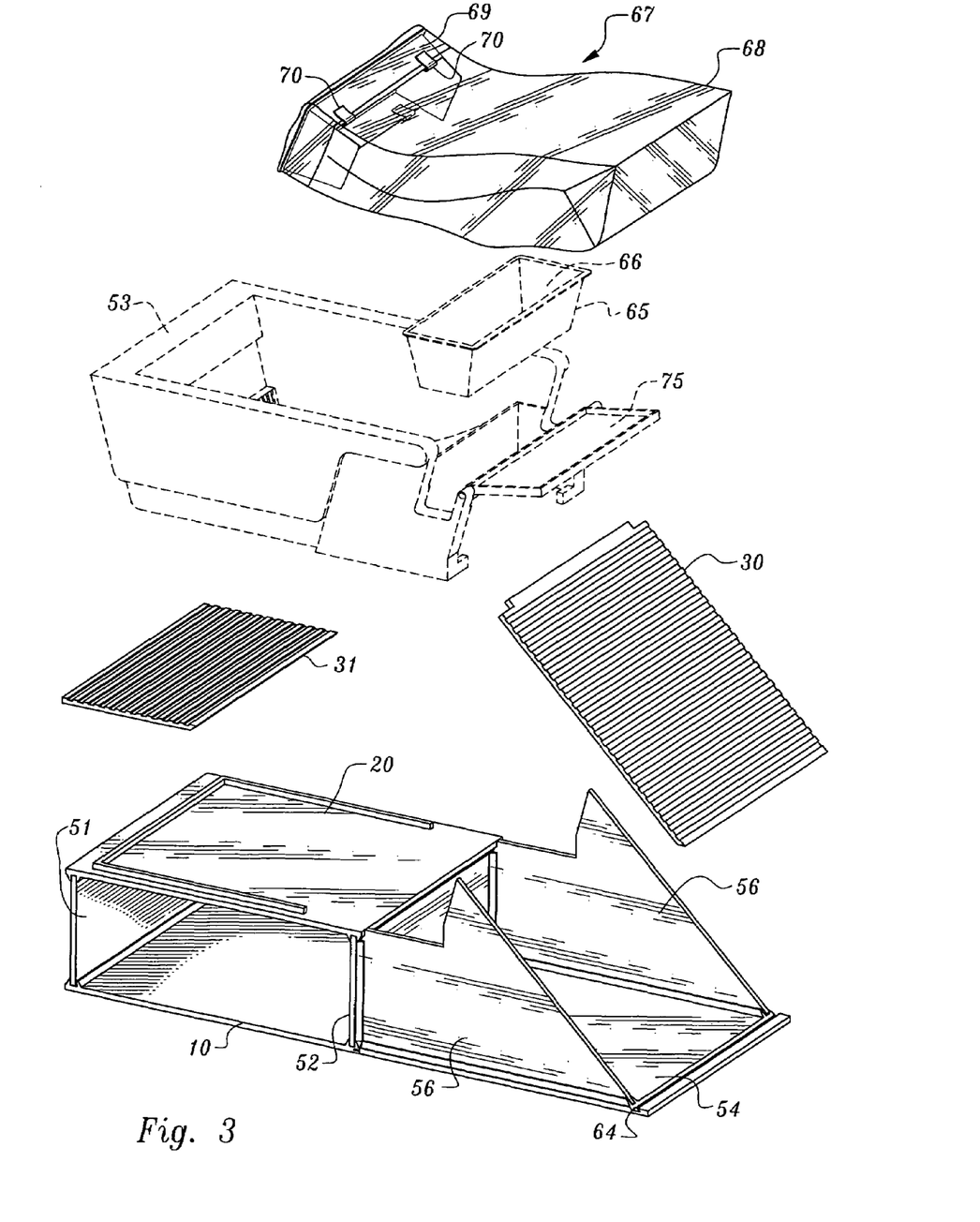
FIG. 3 is a partially exploded perspective view of an apparatus of the present invention.

The ramp 30 shown in FIGS. 1 and 3 is advantageously supported by edges 58 of ramp support panels 56.

Figure 2:
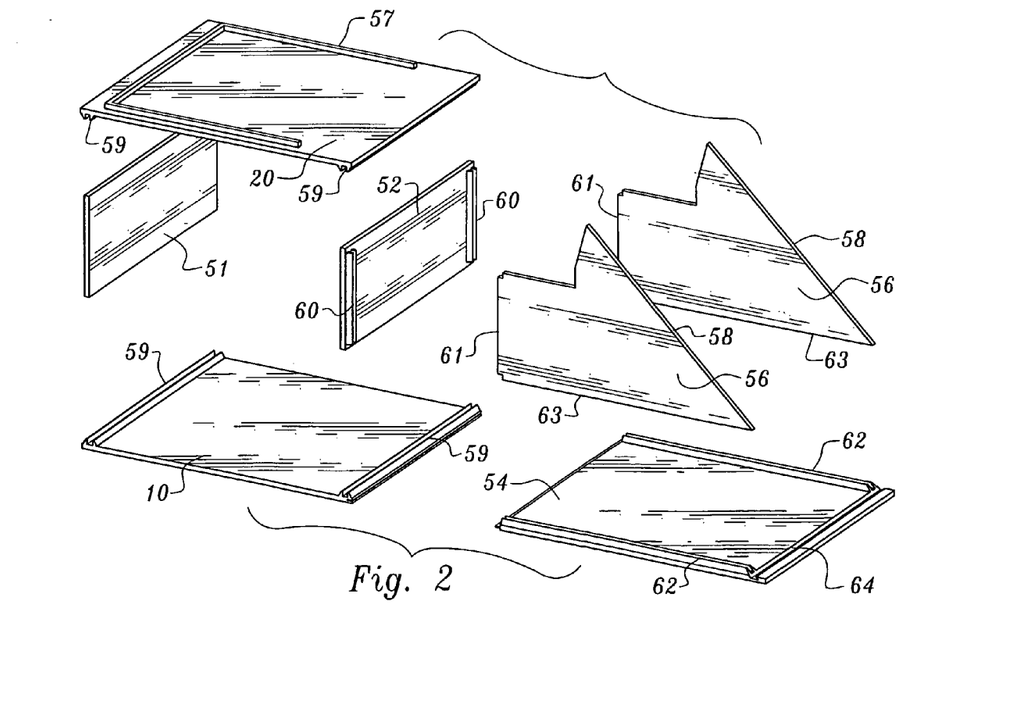
FIG. 2 is an exploded view of an apparatus used in the present invention for elevating the height of a conventional automated litter box system to thereby provide greater height and volume for a waste receptacle of a conventional automated litter box system which is placed on top of the apparatus.

The individual components shown in exploded FIG. 2 are advantageously connected together to form the assembled structure by any known friction connecting devices such as nails, staples, glue, etc. In a preferred embodiment platform 20 and base 10 include grooves 59 so that platform support panels 51 and 52 can be friction fitted therein for easy assembly and disassembly. Similarly platform support panel 52 includes grooves 60 located on either side thereof to friction fit with edge 61 of ramp support panels 56; and extension 54 includes grooves 62 to friction fit with edge 63 of ramp support panels 56. Likewise extension 54 also includes an angled groove 64 to friction fit with a lower edge of ramp 30.

Figure 6:
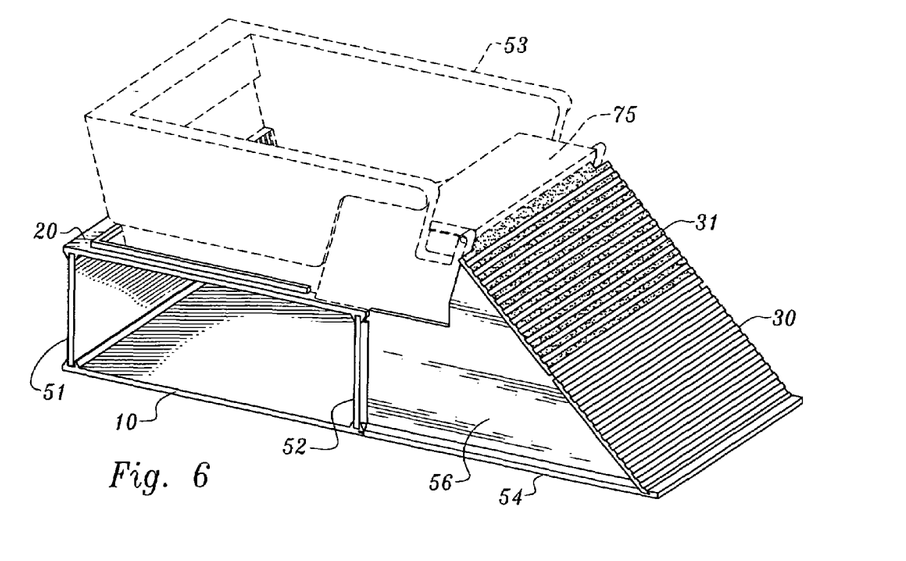
FIG. 6 is a perspective view of an embodiment of the invention.

Ramp 30 is sized so that it extends upward to reach an adjacent portion of lid 75 as shown in FIG. 1. Different sized ramps may be included to accommodate differences in the geometric characteristics of the automated litter box system which is to be utilized. FIGS. 3 and 6 depict a smaller ramp 31.

The conventional automated litter box system 53 shown in FIG. 3 includes a waste receptacle 65 which, in use, would be positioned so that it lies just underneath lid 75 when the lid is closed. Opening lid 75 will therefore expose an aperture or opening of waste receptacle 65 which receives raked animal waste and clumped litter from the litter box of the automated litter box system. The animal waste and clumped litter which passes through aperture 66 collects in waste receptacle 65.

The geometric configuration, and hence the volume of waste receptacle 65 is limited due to the fact that automated litter box system 53 is normally placed on a floor or other typical planar resting surface which prevents extending the waste receptacle below the floor or other planar surface on which the system typically rests. However, placing automated litter box system on platform 20 as depicted in FIGS. 1 and 6, permits the creation of a larger waste receptacle volume. This volume is defined by lid 75, ramp 30, extension 54 and platform support 52. Due to this larger volume, it is possible to collect waste in a retrofitted replacement waste receptacle which replaces waste receptacle 65.

Figure 4:
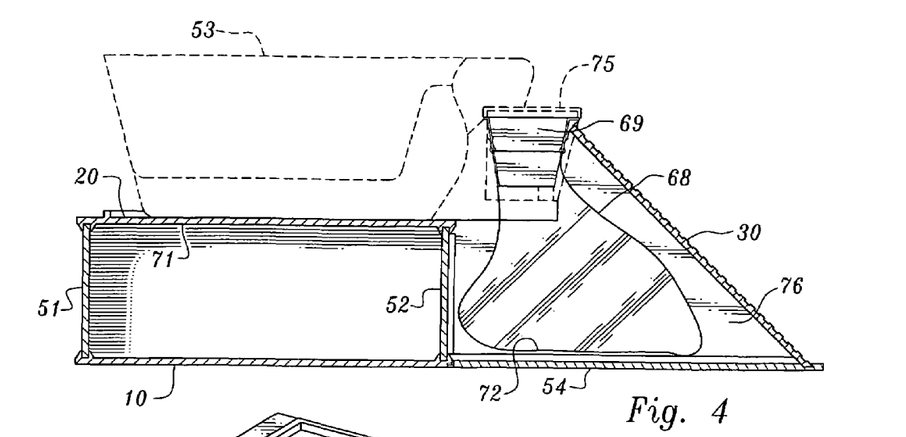
FIG. 4 is a cross-sectional view of the present invention which illustrates the enlarged waste receptacle of an automated litter box system.
Figure 5:
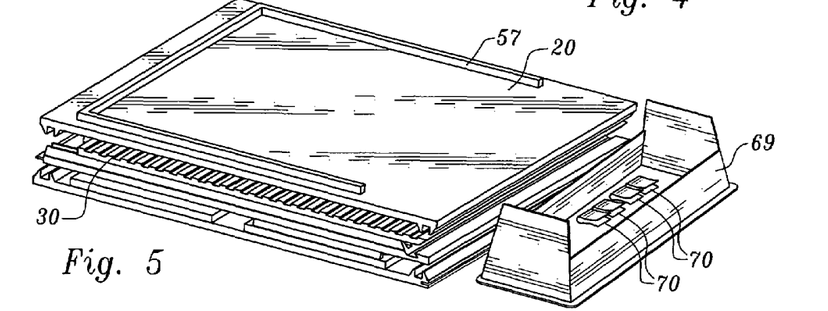
FIG. 5 is a perspective view of a disassembled apparatus of the invention which is used to elevate the automated litter box system.

FIG. 4 depicts an example of a replacement waste receptacle which has been retrofitted to a conventional automated litter box system placed on top of platform 20. Retrofitting occurs by replacing waste receptacle 65 with replacement waste receptacle 67 which is preferably a container, most preferably a disposal container such as a bag 68.

In order to facilitate the replacement of waste receptacle 65 with a replacement receptacle, the replacement receptacle is advantageously configured along an upper portion thereof to match the configuration of waste receptacle 65. For example, a collar 69 is configured to replace waste receptacle 65. Bag 68 is advantageously connected to collar 69 by folding an open end of bag 68 around collar 69 and attaching the opened end of bag 68 to collar 69 by clips 70.

The automated litter box systems to which the present invention pertains are well known to those skilled in the art. Such systems include a litter box configured to contain animal litter therein. The litter box has a bottom surface for placement on a solid environmental surface such as a floor. An automatic waste removing device is configured to automatically remove animal waste and clump litter from the litter box. Typically a rake is used for this purpose. A waste receptacle is connected to the litter box. The waste receptacle has a bottom at one end and an aperture located at another end wherein the aperture is positioned and configured to receive animal waste and clump litter which is removed from the litter box whereby the waste and clumped litter pass through the aperture and accumulate in the waste receptacle. The waste receptacle includes a lid which coves the aperture to thereby enclose the waste receptacle and keep odors from escaping. Conventionally such systems include a lid opening and closing device connected to the lid to open and close the lid.

The present invention provides an improvement over such automated litter box systems by altering the waste receptacle so that the bottom of the waste receptacle is located lower than the bottom surface of the litter box. This is most easily accomplished by raising the automated litter box system above the floor or other planar surface upon which such systems typically rest so that the waste receptacle can be extended in a downward direction to thereby increase the volume thereof. The automated litter box system is advantageously raised above the floor by providing an elevated platform upon which the automated litter box system is positioned. By positioning the litter box system on such an elevated platform, the bottom of the waste receptacle can be located lower than the bottom surface 71 of platform 20. This arrangement will place the bottom of the waste receptacle lower than the bottom surface of the remaining portion of the automated litter box system and lower than the litter box of the system. For example, bag 68 will have a significantly larger volume than what would be obtainable if the automated litter box system were not placed on platform 20.

Preferably the improved automated litter box system of the present invention includes at least one animal access ramp as illustrated in the figures. Most preferably the animal access ramp is attached to the system so that it extends downward from the lid of the waste receptacle to the floor. One ramp is generally sufficient to provide adequate access for the animal which will use the litter box.

The elevated platform is advantageously elevated by at least one support member which is attached to the platform and which extends downward therefrom. In a preferred embodiment the support member comprises a plurality of legs which are preferably in the form of support panels.

A base may be provided underneath the platform and spaced apart therefrom so that the support members extend between the base and the platform. This aspect of the invention provides storage space underneath the platform for storing articles therein. For example, such a storage volume 73 is defined by the bottom surface of the elevated platform, the platform support panels and the base. Various pet related articles may be stored in this volume.

In a preferred embodiment of the invention the base includes an extension which extends underneath the ramp so that one end of the extension is connected to a lower end of the ramp. In this embodiment the ramp extends downward from the lid to one end of the extension of the base. Preferably in this embodiment the system further comprises a pair of ramp support panels 56 as depicted in the figures. In this embodiment the ramp, the ramp support panels, the lid or cover and the extension of the base define a waste collection volume of waste receptacle 76. It is self-evident from FIGS. 4 and 9 that waste receptacle 76 extends vertically from the lid to the extension of the base and thus has a greater height and volume than would be achievable without the present invention.

A disposable waste collecting container is preferably located in the volume of the waste receptacle. The container advantageously has an opening at one end thereof. The opening of the container is connected around a periphery of the aperture whereby waste and clumped animal litter passes through the aperture and collects in the disposable container. Preferably the disposable container is a bag such as bag 68 shown in FIGS. 3, 4 and 9.

Preferably the base and the platform are substantially horizontally disposed and the platform support panels and the ramp support panels are substantially vertically disposed.

The raised platform, preferably in combination with a ramp, as described above, may be used to support a conventional automated litter box system in an elevated position so that the waste receptacle of the conventional system may be replaced with a larger replacement waste receptacle in accordance with this invention. Thus, the invention also pertains to an apparatus for increasing the waste storage capacity of an automated litter box system wherein the apparatus includes an elevated platform, a replacement waste receptacle and an animal access ramp. The platform of such an apparatus is configured to hold a conventional automated litter box system thereon so that the aperture of such a litter box system is positioned above the platform when the litter box system is placed thereon.

The replacement animal waste receptacle of such an apparatus advantageously includes an aperture for the introduction of animal waste into the receptacle wherein the replacement animal waste receptacle and aperture thereof are configured to replace the waste receptacle and aperture of the conventional automated litter box system so that after replacement of the waste receptacle by the replacement waste receptacle, the waste and clumped litter pass through the aperture of the replacement animal waste receptacle and collect in the replacement animal waste receptacle. The replacement animal waste receptacle is also configured to extend from a point above the platform to a point below the platform when the conventional litter box system is placed on the platform and the waste receptacle of the litter box system is replaced by the replacement waste receptacle. This arrangement results in the replacement waste receptacle having a larger volume compared to the volume of the waste receptacle of the automated litter box system.

The animal access ramp of the apparatus has an upper end and a lower end wherein the upper end is positioned above the platform whereby the ramp extends downward from above the platform to provide access by an animal to the automated litter box system when the system is placed on top of the platform. Preferably the ramp is configured and positioned so that the upper end of the ramp will lie adjacent to the lid of the automated litter box system when the system is placed on top of the platform.

The elevated platform is elevated by one or more support members as previously described.

The apparatus may further include a base and an extension thereof as previously described. In addition the ramp may be supported by ramp support panels as previously described and a disposable waste collecting container such as the previously described waste collecting container, especially the disposable bag, may be used in such an apparatus.

The above-described apparatus may be retrofitted onto a conventional automated litter box system by placing the automated litter box system on the elevated platform as described herein so that the waste receptacle of the automated litter box system may be replaced by the replacement waste receptacle described herein.

What is claimed is:

1. In an automated litter box system which comprises:
   a) a litter box configured to contain animal litter therein; the litter box having a bottom surface for placement on a solid environmental surface;
   b) an automatic waste removing device which is configured to automatically remove animal waste and clumped litter from the litter box;
   c) a waste receptacle connected to the litter box, said waste receptacle having a bottom at one end and an aperture located at another end wherein said aperture is positioned and configured to receive the animal waste and clumped litter which is removed form the litter box whereby the waste and dumped litter pass through said aperture and accumulate in said waste receptacle; said waste receptacle including a lid which covers said aperture to thereby enclose said waste receptacle; and
   d) a lid opening and closing device connected to said lid to open and close said lid:
   wherein the improvement comprises a means to secure the litter box to a stabilized elevated platform supported by a horizontal base with at least two platform support panels extending up from said base to define an enclosed article storage area, an upwardly extending frame on a top surface of said platform to help keep the litter box in place, and a ramp operatively coupled to a horizontal extension of said base by grooves located on said extension, at least two ramp support panels extend up from said extension, said ramp support panels and said ramp create a defined, enclosed waste storage area with said bottom of said waste receptacle being located between said ramp and said extension with potential expansion into said article storage area and being located lower than said bottom surface of the litter box.

2. The automated litter box system of claim 1, wherein the bottom surface of the litter box rests on said top surface of an elevated platform, said elevated platform being elevated relative to the bottom of said waste receptacle whereby said bottom of said waste receptacle is lower than a bottom surface of said platform.

3. The automated litter box system of claim 2, wherein said ramp either extends downward from the lid of said waste receptacle or extends downward from the litter box.

4. The automated litter box system of claim 3, wherein said elevated platform is elevated by a support member defining one said panel and has a plurality of said groves which are attached to said platform by said plurality of grooves and said support member extends down from the litter box.

5. The apparatus of claim 4, wherein said at least one support member comprises a plurality of legs.

6. The automated litter box system of claim 5 which further includes said base having a plurality of grooves underneath said platform wherein said base is located at a spaced horizontal position below the bottom surface of said platform; and said plurality of legs comprise at least two platform support panels having a plurality of grooves wherein said platform support panels have an upper end attached to said platform by said plurality of grooves and a lower end attached to said base by said plurality of grooves whereby said bottom surface of said platform, said platform support panels and said base define a volume underneath the liner box for storing articles therein.

7. The automated litter box system of claim 6 which further includes said extension of said base having a plurality of grooves wherein said extension extends underneath said ramp, said extension of the base having one end connected to a lower end of said ramp whereby said ramp extends downward from said lid to said one end of the extension of said base; and said automated litter box system further comprises a pair of ramp support panels having a plurality of grooves and which extend downward from an edge on either side of said ramp to the extension of said base, whereby said ramp, said ramp support panels, said lid and said extension of said base define a waste collection volume of said waste receptacle; said waste receptacle having a height which extends vertically from a bottom of said lid to said extension of said base.

8. The automated litter box system of claim 7, wherein said waste receptacle further comprises a disposable waste collecting container located in said volume of said waste receptacle wherein said container has an opening at one end thereof, said opening of said container being connected around a periphery of said aperture whereby said waste and clumped animal litter passes through said aperture and collects in said disposable container.

9. The automated litter box system of claim 8 wherein said base and said platform are substantially horizontally disposed and said platform support panels and said ramp support panels are substantially vertically disposed.

10. The automated litter box system of claim 8, wherein said disposable container is a bag with an opening at one end thereof and the opening of said bag is connected to said aperture by a collar wherein said collar is configured to attach to the periphery of said aperture.

11. The automated litter box system of claim 10, wherein said bag is attached to said collar by a plurality of clips.

12. An apparatus for increasing waste storage capacity of an automated litter box system of the type which comprises a litter box configured to contain animal litter therein; an automatic waste removing device for removing animal waste and clumped litter from the litter box; a waste receptacle having an aperture which is positioned and configured to receive said animal waste and clumped litter which is removed from the litter box whereby said waste and clumped litter pass through said aperture and accumulate in said waste receptacle; a lid which covers said apt to thereby enclose said waste receptacle; and a lid opening and closing device connected to said lid to open and close said lid; said apparatus comprising:
   a) an elevated platform which is configured to hold said automated litter box system thereon so that said aperture of said litter box system is positioned above said platform when said litter box system is placed on said platform, and an upwardly extending frame on a top surface of said platform to help keep the litter box in place;
   b) a plurality of support panels having a plurality of grooves;
   c) an animal access ramp and at least two ramp support panels connected to said apparatus wherein said ramp bas an upper end and a lower end wherein said upper end is positioned above said platform whereby said ramp extends downward from above said platform to provide access by an animal to said automated litter box system when said system is placed on top of said platform, said access ramp operatively retained by a groove in a horizontal extension of a horizontal base;
   d) said horizontal base having a plurality of grooves and connected with said elevated platform and said animal access ramp by said plurality of support panels to create a defined article storage area and waste storage area underneath said elevated platform and said animal access ramp; and
   e) a replacement animal waste receptacle which includes an aperture for the introduction of animal waste into said receptacle wherein said replacement animal waste receptacle and aperture thereof are configured to replace the waste receptacle and aperture of said automated litter box system so that after replacement of said waste receptacle by said replacement waste receptacle, said waste and clumped litter pass through the aperture of said replacement animal waste receptacle and collect in said replacement animal waste receptacle, with the proviso that said replacement animal waste receptacle is also configured to extend from a point above said platform to a point below said platform when said litter box system is placed on said platform and said waste receptacle of said litter box system is replaced by said replacement waste receptacle, whereby said replacement waste receptacle has a larger volume relative to a volume of said waste receptacle of said automated litter box system, said waste receptacle being located between said access ramp and said horizontal extension of said base with potential expansion into an area beneath said platform.

13. The apparatus of claim 12, wherein said ramp is configured so that said upper end of said ramp lies adjacent to said lid of said automated litter box system when said system is placed on top of said platform.

14. The apparatus of 13 wherein said elevated platform is elevated by at least one support member which is attached to said platform and which extends downward therefrom.

15. The apparatus of claim 14, wherein said at least one support member comprises a plurality of legs.

16. The apparatus of claim 15, which further includes a base underneath said elevated platform wherein said base is spaced apart from said elevated platform; and said plurality of legs comprise at least two platform support panels wherein said platform support panels have an upper end attached to said platform and a lower end attached to said base whereby said bottom surface of said elevated platform, said platform support panels, and said base define a volume underneath the litter box for storing articles therein.

17. The apparatus of claim 16 which further includes said extension of said base wherein said extension extends underneath said ramp, said base having one end connected to a lower end of said ramp whereby said ramp extends from said one end of said base to the lid of said automated litter box system when said system is placed on top of said platform; and said apparatus further comprises a pair of ramp support panels which extend downward from an edge on either side of said ramp to the extension of said base, whereby said ramp, said ramp support panels, said lid and said extension of said base define a waste collection volume of said replacement waste receptacle when said litter box system is placed on said platform and said waste receptacle of said litter box system is replaced by said replacement waste receptacle; said replacement waste receptacle having a height which extends vertically from a lower surface of said lid to said extension of said base when said waste receptacle of said litter box system is replaced by said replacement waste receptacle and said litter box system is placed on said platform.

18. The apparatus of claim 17 wherein said replacement waste receptacle further comprises a disposable waste collecting container located in said volume of said replacement waste receptacle wherein said container has an opening at one end thereof, said opening of said container being connected around a periphery of the aperture of the replacement waste receptacle whereby said waste and clumped animal litter passes though said aperture of the replacement waste receptacle and collects in said disposable container.

19. The apparatus of claim 18 wherein said base and said platform are substantially horizontally disposed and said platform support panels and said ramp support panels are substantially vertically disposed.

20. The apparatus of claim 19 wherein said disposable container is a bag with an opening at one end thereof and the opening of said bag is connected to said aperture of the replacement waste receptacle by a collar wherein said collar is configured to attach to the periphery of said aperture of the replacement waste receptacle.

21. The apparatus of claim 20 wherein said bag is attached to said collar by a plurality of clips.

22. A method for increasing waste storage capacity of an automated litter box system which comprises providing the apparatus of claim 12 and placing said automated litter box system on said apparatus wherein said automated litter box system rests on said elevated platform; and replacing the waste receptacle of the automated litter box system with the replacement waste receptacle of said apparatus.

23. An apparatus for increasing waste storage capacity of an automated litter box system wherein said apparatus comprises:
- a plurality of support members;
- means for joining said support members to create a stable platform on which a pet litter box is placed; ramp element to provide pet access from a floor to said platform; and means for joining said ramp element with said platform;
- whereby said automated litter box system will be elevated off of said floor or off of a planar resting surface such that a pet owner can use a larger conventional waste storage container to collect pet waste therein to thereby reduce the frequency in which the pet owner needs to empty the waste collection container, resulting in less effort being required from the pet owner to maintain the litter box in a sanitary manner; said support members include: a horizontal base having opposed extremities with groove means disposed thereon; a pair of platform support panels each having an extremity with means complemental to said groove means for fixing said support panels in static relationship to said base; an elevated platform having groove means in operative relationship with said platform support panels at extremities remote from said base, said elevated platform having a bottom surface and a top surface provided with and upwardly extending frame means dimensioned to fixedly secure the litter box during operation, one said platform support panel having an exterior surface remote from said other platform support panel provided with groove means operatively coupled to a ramp means, said ramp means including at least two ramp support panels and an underlying horizontal ramp base extension, said ramp support panels operatively inserted into groove means in said base extension and on the platform support panel, said ramp being fixed on said ramp support panels and said base extension; and said waste storage container being located between said ramp and said base extension with potential expansion into an area beneath said elevated platform.

* * * * *